(12) United States Patent
Kwak et al.

(10) Patent No.: US 9,078,093 B2
(45) Date of Patent: Jul. 7, 2015

(54) APPARATUS AND METHOD FOR RECOGNIZING TARGET MOBILE COMMUNICATION TERMINAL

(71) Applicant: Electronics and Telecommunications Research Institute, Daejeon-si (KR)

(72) Inventors: Byung-Jae Kwak, Daejeon-si (KR); Young-Hoon Kim, Daejeon-Si (KR); Seung-Chan Bang, Daejeon-si (KR); Pyeong-Jung Song, Daejeon-si (KR); Jae-Ho Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 68 days.

(21) Appl. No.: 13/655,919

(22) Filed: Oct. 19, 2012

(65) Prior Publication Data

US 2013/0100853 A1 Apr. 25, 2013

(30) Foreign Application Priority Data

Oct. 19, 2011 (KR) .................. 10-2011-0107034
Sep. 14, 2012 (KR) .................. 10-2012-0102304

(51) Int. Cl.
*H04L 12/28* (2006.01)
*H04W 4/02* (2009.01)
*H04W 48/16* (2009.01)

(52) U.S. Cl.
CPC ............. *H04W 4/02* (2013.01); *H04W 4/026* (2013.01); *H04W 48/16* (2013.01)

(58) Field of Classification Search
CPC .......... H04L 12/28; H04L 12/26; G01S 5/04; H04J 1/16; H04W 24/00; H04W 88/02
USPC .............. 370/252, 254, 241; 455/457, 456.1, 455/67.11; 701/300; 342/394, 378, 357.42, 342/432; 709/224
See application file for complete search history.

(56) References Cited

U.S. PATENT DOCUMENTS

| 2010/0246438 | A1* | 9/2010 | Potkonjak | 370/254 |
|---|---|---|---|---|
| 2011/0081919 | A1* | 4/2011 | Das et al. | 455/456.1 |
| 2011/0199917 | A1* | 8/2011 | Karaoguz et al. | 370/252 |
| 2012/0082039 | A1* | 4/2012 | Li et al. | 370/252 |
| 2013/0002489 | A1* | 1/2013 | Erad et al. | 342/432 |

OTHER PUBLICATIONS

Corson, M. Scott et al., "Toward Proximity-Aware Internetworking," IEEE Wireless Communications, vol. 17 (6):26-33 (2010).

* cited by examiner

*Primary Examiner* — Bob Phunkulh
*Assistant Examiner* — Wali Butt
(74) *Attorney, Agent, or Firm* — Nelson Mullins Riley & Scarborough LLP; Anthony A. Laurentano, Esq.; Lewis Lee, Esq.

(57) ABSTRACT

A method and apparatus for a mobile communication terminal to recognize a target mobile communication terminal using a location recognition system. The method includes acquiring own location information of the mobile communication terminal; creating identification verification information using the location information, the identification verification information containing an identification formula for identifying the target mobile communication terminal as a target of communication; transmitting the created identification verification information to at least one other mobile communication terminal within a communication coverage area; receiving an identification response packet from the at least one other mobile communication terminal which has received the identification verification information, the identification response packet indicating whether the other mobile communication terminal is a target mobile communication terminal; and determining the target mobile communication terminal based on the received identification response packet.

15 Claims, 9 Drawing Sheets

LOCATION SENSOR UNIT

APPARATUS AND METHOD FOR RECOGNIZING TARGET MOBILE COMMUNICATION TERMINAL

CROSS-REFERENCE TO RELATED APPLICATION

This application claims the benefit under 35 U.S.C. §119 (a) of Korean Patent Application Nos. 10-2011-0107034, filed on Oct. 19, 2011, and 10-2012-0102304, filed on Sep. 14, 2012, the entire disclosures of which are incorporated herein by references for all purposes.

BACKGROUND

1. Field

The following description relates to a technology for recognizing a target object using location information provided from a global positioning system (GPS) or a system having similar functions as those of the GPS, and more particularly, to an apparatus and method for recognizing a target mobile communication terminal, which is to be communicated with, using a location recognition system.

2. Description of the Related Art

Global positioning systems (GPS) generally refer to location recognition systems or devices therefor, which have been developed by complementing U.S. navy satellite navigation systems used for the military purpose by the U.S. Department of Defense, so as to provide aircrafts in flight and ships at sea with their current exact locations at any points of the earth. Due to the advantages of GPS that enables obtaining relatively accurate location information with a simple GPS receiver, the GPS has been increasingly widely used in various fields, not only for navigation systems for aircrafts and ships but also for construction engineering, personal laptop computers, and mobile phones.

However, during the transmission of signals from transmitters of GPS satellites to a GPS receiver that achieves a resulting value from the signals, various error factors (for example, errors in satellite clocks, satellite orbit errors, ionosphere delay errors, convection layer errors, multi-path errors, etc.) may be generated, which may lead to a user acquiring inaccurate resulting location values.

Meanwhile, location information of other mobile communication terminals within a communication coverage area of a mobile communication terminal that is willing to communicate with the other mobile communication terminal may be useful for the mobile communication terminal to identify a target mobile communication terminal to communicate with.

The mobile communication terminal to communicate with another mobile communication terminal may receive location coordinate information of the other mobile communication terminals within a communication coverage area and may use the received information. However, this method may contradict itself because the mobile communication terminal needs to communicate, in advance, with the other mobile communication terminal to identify whether the other mobile communication terminal is a target or not, and communicating with all other mobile communication terminals within the communication coverage area may be a waste of the limited wireless resources from a physical layer perspective, and also may cause overhead problems from a media access control (MAC) perspective. In addition, even when receiving the location coordinates of the other mobile communication terminals within the communication coverage area, it may be difficult for the mobile communication terminal of interest to identify a number of location coordinates of the other mobile communication terminals from one another.

SUMMARY

The following description relates to a method and apparatus for recognizing a target mobile communication terminal to communicate with while reducing the number of exchanges of location coordinate information between mobile communication terminals.

In one general aspect, there is provided a method for a mobile communication terminal to recognize a target mobile communication terminal, the method including: acquiring own location information of the mobile communication terminal; creating identification verification information using the location information, the identification verification information containing an identification formula for identifying the target mobile communication terminal as a target of communication; transmitting the created identification verification information to at least one other mobile communication terminal within a communication coverage area; receiving an identification response packet from the at least one other mobile communication terminal which has received the identification verification information, the identification response packet indicating whether the other mobile communication terminal is a target mobile communication terminal; and determining the target mobile communication terminal based on the received identification response packet.

The acquiring of the location information may include receiving the own location information of the mobile communication terminal and calculating own location parameters using the received location information, and calculating orientation parameters with respect to the target mobile communication using an orientation sensor.

The calculating of the own location parameters may include calculating an orientation angle of the target mobile communication terminal with respect to a reference direction that is parallel to a latitude line.

The creating of the identification verification information may include creating the identification verification information including an identification formula that is an equation of a straight line connecting the mobile communication terminal and the target mobile communication terminal.

The creating of the identification verification information may include creating the identification verification information further including information about accuracy of the location parameters of the mobile communication terminal.

The receiving of the identification response packet may include receiving the identification response packet from the at least one other mobile communication terminal which has received the identification verification information within the communication coverage area wherein the identification response packet indicates a determination which is made, using a threshold obtained based on the information about accuracy of the location parameters of each of the at least one other mobile communication terminal, which has received the identification verification information, and the information about accuracy of the location parameters of the mobile communication terminal, on whether or not the at least one other mobile communication terminal is the target mobile communication terminal.

The creating of the identification verification information may include creating the identification verification information further including preferred distance range information of the mobile communication terminal.

The receiving of the identification response packet may include receiving the identification response packet from the at least one other mobile communication terminal, the identification response packet indicating a determination which is made, using the preferred distance range information, on whether the at least one other mobile communication terminal is the target mobile communication terminal.

The determining of the target mobile communication terminal may include, when receiving a plurality of identification response packets, analyzing the received identification response packets and determining a mobile communication terminal with a highest probability as the target mobile communication terminal based on a result of analysis.

The method may further include determining whether to further transmit and receive a packet to and from the determined target mobile communication terminal.

In another general aspect, there is provided an apparatus for a mobile communication terminal to recognize a target mobile communication terminal, the apparatus including: a location sensor unit configured to measure own location information of the mobile communication terminal; an identification verification information creation unit configured to create identification verification information by forming an identification formula using the location information; and an identification unit configured to transmit the identification verification information to at least one other mobile communication terminal within a communication coverage area and determine whether the at least one other mobile communication terminal that transmits an identification response packet to the identification unit in response to the identification verification information is the target mobile communication terminal based on the received identification response packet.

The location sensor unit may be configured to include a coordinate sensor unit configured to receive the own location information of the mobile communication terminal and calculate own location parameters, and an orientation sensor unit configured to calculate orientation parameters with respect to the target mobile communication terminal using an orientation sensor.

The identification verification information creation unit may be configured to create the identification verification information by forming an identification formula that is an equation of a straight line connecting the mobile communication terminal and the target mobile communication terminal using the location information.

The identification verification information creation unit may be configured to create the identification verification information further including information about accuracy of location parameters of the mobile communication terminal.

The identification unit may be configured to, when receiving a plurality of identification response packets from a plurality of other mobile communication terminals within the communication coverage area, analyze the received identification response packets and determine a mobile communication terminal with a highest probability as the target mobile communication terminal based on a result of analysis.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
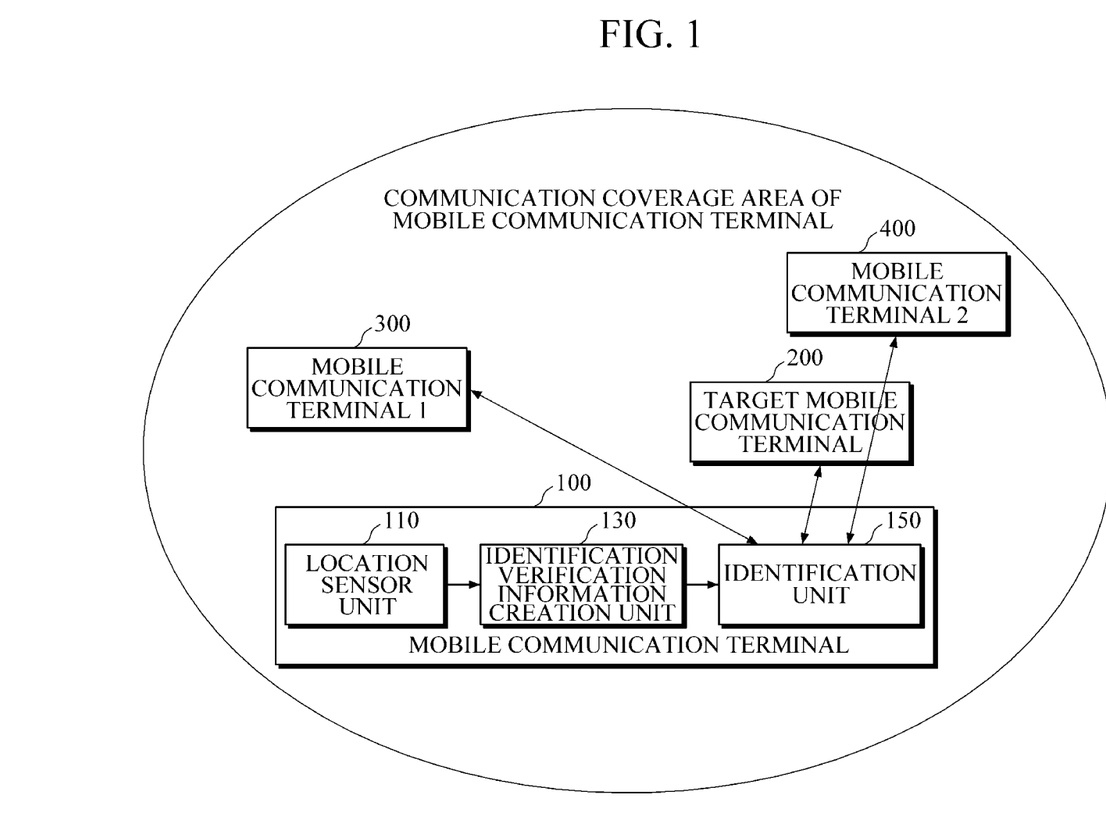
FIG. 1 is a diagram illustrating configurations of a mobile communication terminal and of a system allowing one mobile communication terminal to recognize a target mobile communication terminal according to an exemplary embodiment of the present invention.
Figure 2:
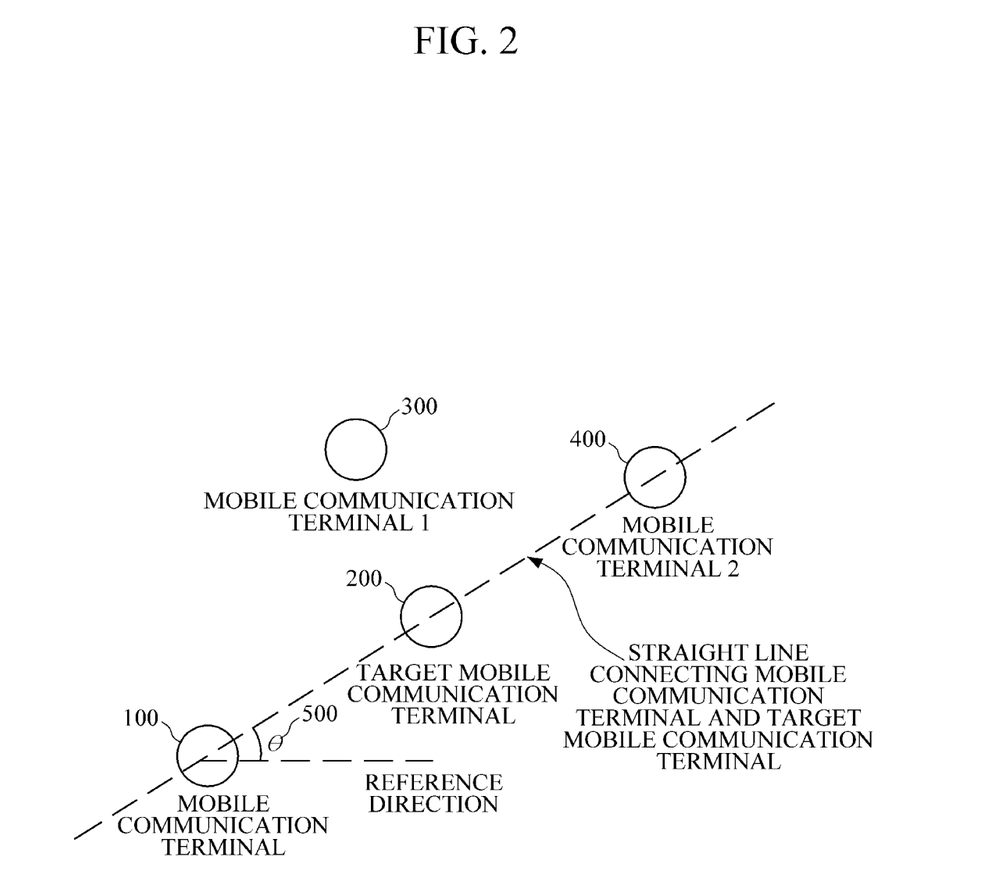
FIG. 2 is a diagram illustrating a positional relationship among the mobile communication terminals in the system shown in FIG. 1.

FIG. 1 is a diagram illustrating configurations of a mobile communication terminal and of a system allowing one mobile communication terminal to recognize a target mobile communication terminal from among a number of other mobile communication terminals according to an exemplary embodiment of the present invention. FIG. 2 is a diagram illustrating a positional relationship among the mobile communication terminals in the system shown in FIG. 1.

Referring to FIGS. 1 and 2, the mobile communication terminal 100 may include a location sensor unit 110, an identification verification information creation unit 130, and an identification unit 150 in an effort to recognize the target mobile communication terminal 200.

The location sensor unit 110 may receive its location information and obtain location parameters regarding its location. The location parameters may include the latitude or the longitude of a latitude-longitude-height system, an Earth-centered-Earth-fixed (EXEF) XYZ coordinates, or Universal Transverse Mercator (UTM) coordinates. In addition, the GPS or the location recognition system similar to the GPS may include an active badge system, an active BAT system using ultrasonic travel time, 802.11RF scene analysis and triangulation (RADAR), and location-based services.

The location sensor unit 110 may measure an orientation parameter related to an orientation angle of the target mobile communication terminal 200 with respect to a reference direction using an orientation sensor. The reference direction may be a direction parallel to the latitude line of the mobile communication terminal 100, and the orientation parameter may be an orientation angle θ 500 of the counter mobile communication terminal 200 with respect to the reference direction, which is parallel to the latitude line of the mobile communication terminal 100.

The identification verification information creation unit 130 may create identification verification information using the location information in an effort to recognize the target mobile communication terminal 200 from among a number of other mobile communication terminals 200, 300 and 400 within a communication coverage area. For example, using own location parameters and orientation parameter, the identification verification information creation unit 130 may configure an identification formula that is an equation of a straight line connecting the mobile communication terminal 100 and the target mobile communication terminal 200, and also create the identification verification information containing information regarding the identification formula. In this case, the identification formula may be made based on the location coordinates of the mobile communication terminal 100 and the orientation angle θ 500 of the target mobile communication terminal 200 with respect to the reference direction that is parallel to the latitude line of the mobile communication terminal 100. The identification formula may be an equation of a straight line. In addition, the mobile communication terminal 100 may include information about its location parameters, information about the accuracy of location parameters or information about a preferred distance range. The information about the accuracy of location parameters of the mobile communication terminal 100 may be information that can indicate the accuracy of GPS coordinates such as the standard deviation of GPS measurement errors or a GPS reception status.

The identification verification information creation unit 130 may use various methods to make an equation of a straight line, and may derive the equation through three steps as shown in Table 1.

TABLE 1

Step 1: The mobile communication terminal 100 obtains its location coordinates $(x_0, y_0)$ from received GPS satellite signals.
Step 2: The mobile communication terminal 100 calculates an orientation angle Θ 500 between the target mobile communication terminal 200 and a reference direction using the orientation sensor. The reference direction may be parallel to the latitude line of the mobile communication terminal 100.
Step 3: The mobile communication terminal 100 derives an equation for a straight line connecting the mobile communication terminal 100 and the target mobile communication terminal 200 based on the location coordinates $(x_0, y_0)$ of the mobile communication terminal 100 and the orientation angle Θ 500 of the target mobile communication terminal 200 calculated in step 2.

The equation for a straight line connecting the locations of the mobile communication terminal 100 and the target mobile communication terminal 200 may be represented as:

$$\cos(\theta) \times (y - y_0) = \sin(\theta) \times (x - x_0) \quad (1)$$

Formula 1 may also be expressed as:

$$\sin(\theta) \times x - \cos(\theta) \times y + (\cos(\theta) \times y_0 - \sin(\theta) \times x_0) = 0 \quad (2)$$

Generally, a linear equation of a straight line is expressed as:

$$ax + by + c = 0 \ (a^2 + b^2 = 1) \quad (3)$$

When values are set for a, b, and c, the straight line can be determined as being unique. Therefore, it can be appreciated that a set of three constants (a, b, c) may represent the straight line.

Formula 2 is obtained from Formula 3, where $a = \sin(\theta)$, $b = -\cos(\theta)$ and $c = (\cos(\theta) \times y_0 - \sin(\theta) \times x_0)$.

In addition, $(x_0, y_0, \theta)$ also can be used to represent the straight line. Formula 3 is provided for purpose of example and other forms of equation of a straight line may be used.

The identification unit 150 may transfer identification verification information including the equation of a straight line to the other mobile communication terminals 200, 300, and 400 within the communication coverage area. For example, the identification unit 150 may send a set of three real numbers (a, b, c) that represents a straight line. The set of three real numbers may be sent by broadcast, multicast or unicast, or may be transmitted within a specific area using a technique such as beamforming.

Table 2 shows examples of identification verification information transferred by the mobile communication terminal 100.

TABLE 2

| Straight Line Information | a, b, c | Essential Information |
|---|---|---|
| Own Coordinates of Terminal | $(x_0, y_0)$ | Optional |
| Preferred Distance Range | 10 m-50 m | Optional |
| Standard Deviation of GPS Coordinates | 10 m | Optional |

The mobile communication terminals 200, 300, and 400 within the communication coverage area may obtain their own location coordinates $(x_i, y_i)$ from a GPS or a similar system. In addition, the mobile communication terminals 200, 300, and 400 may confirm whether they are a target terminal with which the mobile communication terminal 100 wishes to communicate based on the identification verification information transferred from the mobile communication terminal 100. The mobile communication terminals 200, 300, and 400 may confirm whether they are a target terminal by checking if the received identification information satisfies Formula 4 below.

Formula 4 is obtained, as below, by substituting location coordinates $(x_i, y_i)$ of each mobile communication terminal 200, 300, and 400 into Formula 3.

$$ax_i + by_i + c = 0 \quad (4)$$

If the coordinates $(x_i, y_i)$ are present on a straight line, Formula 4 is satisfied, and otherwise, Formula 4 is not met. That is, a mobile communication terminal 200 that satisfies Formula 4, from among the mobile communication terminals 200, 300, and 400, is determined as a target mobile communication terminal.

Theoretically, the target mobile communication terminal 200 always satisfies Formula 4 since it is present on a straight line connecting it and the mobile communication terminal 100. However, due to errors in GPS information, errors of the orientation sensor and errors by a user, there may be a case where Formula 4 is not satisfied even when the mobile communication terminal 200 is the target terminal of the mobile communication terminal 100. Thus, when determining a target mobile communication terminal, it would be more preferable to check whether or not a distance between the coordinates $(x_i, y_i)$ of a mobile communication terminal and the straight line ax+by+c=0 is smaller than a threshold $d_{th}$, as represented in Formula 5 below, than to check whether Formula 4 is satisfied or not. In this case, the reference $d_{th}$ may be calculated using information contained in the identification verification information, for example, a distance from the mobile communication terminal 100, information regarding the accuracy of location parameters of the mobile communication terminal 100, information regarding the accuracy of location parameters of a corresponding mobile communication terminal receiving the identification verification information, and a distribution of orientation angle measurement errors of the mobile communication terminal 100.

distance[$(x_i,y_i)$,ax+by+c=0]>$d_{th}$=>Mobile communication terminal is not present on straight line distance[$(x_i,y_i)$,ax+by+c=0]<$d_{th}$=>Mobile communication terminal is present on straight line (5)

where a distance between coordinates $(x_i, y_i)$ and a straight line ax+by+c=0 can be obtained by Formula 6 below:

$|ax_i+by_i+c|(a^2+b^2=1)$ (6)

If location coordinates of a mobile communication terminal from among the mobile communication terminals 200, 300, and 400 within the communication coverage area are $(x_i, y_i)$ and a distance between the location coordinates $(x_i, y_i)$ and a straight line ax+by+c=0 is smaller than the threshold $d_{th}$, the mobile communication terminal may transmit an identification response packet to the identification unit 150 in response to the identification verification information. The identification response packet may include information about a fact that the corresponding mobile communication terminal exists on the straight line, a distance from the straight line to the corresponding mobile communication terminal, an ID of the corresponding mobile communication terminal, an estimated distance between the mobile communication terminal 100 and the corresponding mobile communication terminal, and device information of the corresponding mobile communication terminal. The device information of the mobile communication terminal may be, for example, capability, available services, and preferences of the mobile communication terminal.

As shown in FIG. 2, if another mobile communication terminal 2 400 is present on the straight line connecting the target mobile communication terminal 200 and the mobile communication terminal 100, the preferred distance range information contained in the identification verification information transferred from the identification unit 150 may be used.

For example, under the assumption that the preferred distance range included in the information transferred from the identification unit 150 is between 10 m and 50 m, if a distance from the target mobile communication terminal 200 to the mobile communication terminal 100 is 40 m and a distance from the other mobile communication terminal 2 400 to the mobile communication terminal 100 is shorter than 10 m or longer than 50 m, the mobile communication terminal 200 may recognize itself as the target mobile communication terminal since its distance to the mobile communication terminal 100 falls within the preferred distance range between 10 m and 50 m. In addition, the other mobile communication terminal 2 400 is able to determine itself as not a target terminal with which the mobile communication terminal 100 wishes to communicate since its distance to the mobile communication terminal 100 is out of the preferred distance range. In this case, the other mobile communication terminal 2 400, which is not the target of communication, may respond to the identification unit 150 by transmitting an identification response packet, or may not. In the case of transmitting the identification response packet, the types of information contained in the identification response packet may not need to be the same as the types of information included in the identification response packet from the target mobile communication terminal 200.

In the case of another mobile communication terminal 1 300 whose distance from the straight line connecting the mobile communication terminal 100 and the mobile communication terminal 200 is greater than the threshold $d_{th}$ and position is out of the straight line, the mobile communication 1 300 may obtain its own location coordinates $(x_2, y_2)$ from signals received from a GPS or a similar system, receive information from the identification unit 150 and check, based on the received information, whether it is a target terminal with which the mobile communication terminal 100 wishes to communicate. The mobile communication terminal 1 300 may employ Formula 5 that uses the preferred distance range information to check whether the mobile communication terminal 1 300 is a target of communication.

However, because the distance from the mobile communication terminal 1 300 and the straight line of the identification formula is greater than the threshold $d_{th}$, the mobile communication terminal 1 300 has already determined itself as not a target of communication before using the preferred distance range information.

In this case, the mobile communication terminal 1 300 which is not a target of communication may respond to the identification 150 by sending an identification response packet, or may not.

In the case of transmitting the identification response packet, the types of information contained in the identification response packet may not need to be the same as the types of information in the identification response packet from the target mobile communication terminal 200.

The identification unit 150 may receive the identification response packet in response to the transmitted identification verification information, and determine, based on the received identification response packet, whether to transmit and receive further packets to and from the mobile communication terminal that has sent the identification response packet.

For example, when intending to transmit and receive data to or from the target mobile communication terminal 200, the mobile communication terminal 100 may take procedures for data communication with the target mobile communication terminal 200. As another example, if the mobile communication terminal 100 is to simply estimate a distance to the target mobile communication terminal 200, it may not transmit further packets.

In addition, in response to the identification response packet being received from the mobile communication terminal 1 300 or the mobile communication terminal 2 400, the identification unit 150 may ignore the received identification packet.

If the identification unit 150 receives one or more identification response packets and a result of analyzing the received packets shows that there are one or more mobile communication terminals satisfying the communication target requirements, a mobile communication terminal with the highest probability is determined as the target of communication. For example, the mobile communication terminal closest to the straight line may be determined as the target of communication.

If the result of analyzing the identification response packets received by the identification unit 150 shows that there is no communication terminal satisfying the communication target requirements, the identification unit 150 may determine that it has failed to recognize the target of communication, or may choose a mobile communication terminal with the highest probability from among the mobile communication terminals that have not satisfied the requirements but sent the response.

Figure 3:
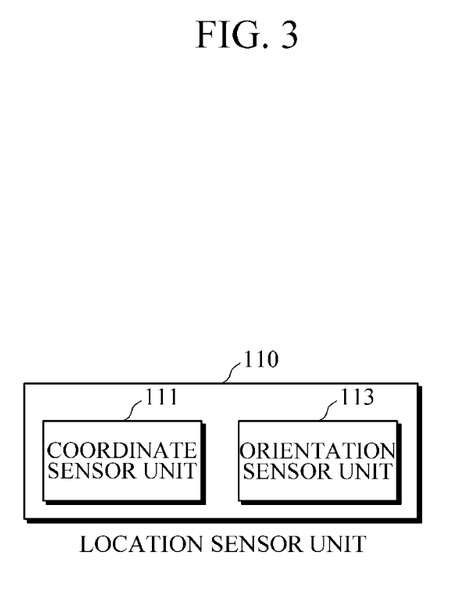
FIG. 3 is a diagram illustrating a configuration of a location sensor unit of a mobile communication terminal according to an exemplary embodiment of the present invention.

FIG. 3 is a diagram illustrating a configuration of a location sensor unit of a mobile communication terminal according to an exemplary embodiment of the present invention.

As shown in FIG. 3, the location sensor unit 110 may include a coordinate sensor unit 111 and an orientation sensor unit 113.

The coordinate sensor unit 111 may obtain location parameters related to the location of the mobile communication terminal using a GPS or a similar system. The parameters may include the latitude, the longitude, and the coordinates of the mobile communication terminal.

The orientation sensor unit 113 may acquire an orientation parameter related to the orientation of the target mobile communication terminal 200 with respect to a reference direction using an orientation sensor, wherein the reference direction may be a direction parallel to the latitude line and the orientation parameter may be an orientation angle.

Figure 4:
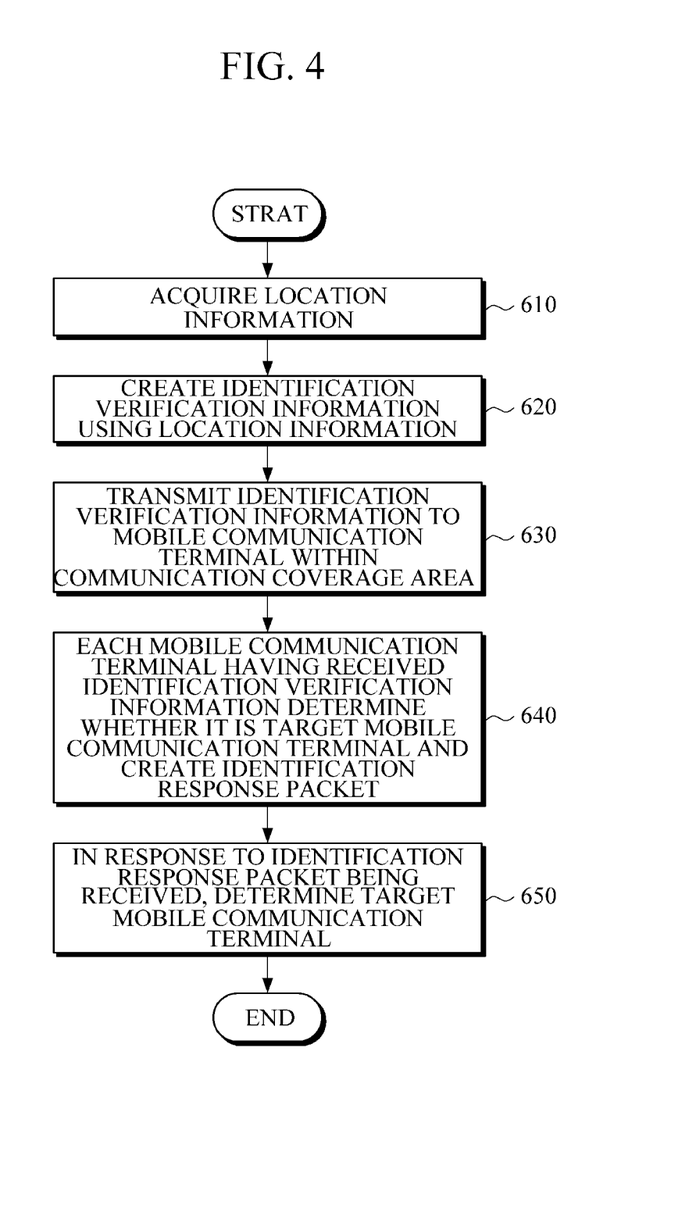
FIG. 4 is a flowchart illustrating an example of a method of a mobile communication terminal recognizing a target mobile communication terminal according to an exemplary embodiment of the present invention.

FIG. 4 is a flowchart illustrating an example of a method of a mobile communication terminal recognizing a target mobile communication terminal according to an exemplary embodiment of the present invention.

Referring to FIG. 4 in conjunction with FIG. 1, the mobile communication terminal 100 that wishes to communicate with the target communication terminal 200 acquires its own location information in 610. The location information may include the location parameters of the mobile communication terminal 100 and an orientation parameter related to the orientation of the target mobile communication terminal 200 with respect to a reference direction. For example, the location parameters may be obtained using a GPS or a similar system, and the orientation parameter may be obtained using an orientation sensor. The location parameters may be the latitude, the longitude or the coordinates of the mobile communication terminal 100. The orientation parameter may be an orientation angle and the reference direction may be a direction parallel to the latitude line.

Thereafter, so as to identify the target mobile communication terminal as a target of communication from among the mobile communication terminals 200, 300, and 400 within the communication coverage area, the mobile communication terminal 100 creates identification verification information using the location information in 620. For example, by using its own location parameters and orientation parameter, the mobile communication terminal 100 may configure an identification formula that is an equation of a straight line connecting the mobile communication terminal 100 and the target mobile communication terminal 200, and create the identification verification information including a set of three real numbers (a, b, c) that represents the identification formula. In addition, the identification verification information may contain coordinates $(X_0, Y_0)$ of the mobile communication terminal 100, preferred distance range information of the mobile communication terminal 100, information about the accuracy of location parameters of the mobile communication terminal 100, and the like.

Once the identification verification information is created, the mobile communication terminal 100 transmits the created identification verification information to the mobile communication terminals 200, 300, and 400 within the communication coverage area in 630. For example, the identification verification information may be sent to all mobile communication terminals 200, 300, and 400 within the communication coverage area by broadcast, multicast or unicast, or sent to only some mobile communication terminals within a specific area by a technique such as beamforming.

The mobile communication terminals 200, 300, and 400 each determines whether it is a target of communication, and creates an identification response packet in response to the identification verification information in 640.

For example, referring to FIG. 2, under the assumption that the identification verification information includes the identification formula and information about the accuracy of the location parameters and the preferred distance range information of the mobile communication terminal 100, the target mobile communication terminal 200 determines a reference $d_{th}$ based on the received information about the location parameters of the mobile communication terminal 100, the information about the accuracy of location parameters thereof, a distance to the mobile communication terminal 100, and the distribution of the orientation angle measurement errors, and compares a distance from its location to the straight line as the identification formula to the reference $d_{th}$. Since the distance from the mobile communication terminal 200 to the straight line as the identification formula is smaller than the threshold $d_{th}$ and the mobile communication terminal 200 is located within the preferred distance range of the mobile communication terminal 100, the mobile communication terminal 200 determines itself as a target of communication, and, in response, creates the identification response packet. The identification response packet of the mobile communication terminal 200 may include the information indicating the presence of the mobile communication terminal 200 on the straight line, a distance from the straight line, an ID of the mobile communication terminal 200, an estimated distance from the target mobile communication terminal 200 to the mobile communication terminal 100 and device information of the target mobile communication terminal 200. The device information of the mobile communication terminal may include capability, available services and preference of the mobile communication terminal.

For example, referring to FIG. 2, the mobile communication terminal 1 300 may determine itself as not a target mobile communication terminal because the distance to the straight line is greater than the threshold $d_{th}$ that has been specified based on information about the accuracy of location parameters of the mobile communication terminal 1 300. In this case, the mobile communication terminal 1 300 may create the identification response packet, or may not. Even when the mobile communication terminal 1 300 creates the identification response packet, the types of information contained in the identification response packet may not need to be the same as the types of information contained in the identification response packet from the target mobile communication terminal 200.

For another example, referring to FIG. 2, the mobile communication terminal 2 400 may determine itself as not a target mobile communication terminal because even though a distance to the straight line is smaller than a threshold $d_{th}$ that has been specified based on information about the accuracy of location parameters of the mobile communication terminal 2 400 the mobile communication terminal 2 400 is located out of the preferred distance range of the mobile communication terminal 100. In this case, the mobile communication terminal 2 400 may create an identification response packet, or may not. Even when the mobile communication terminal 2 400 creates the identification response packet, the types of information contained in the identification response packet may not need to be the same as the types of information contained in the identification response packet from the target mobile communication terminal 200.

Thereafter, in response to the identification response packet being received, the mobile communication terminal 100 determines the mobile communication terminal 200 as a target of communication in 650. In the above examples, only the mobile communication terminal 200 is determined as the target of communication. Unlike the above examples, if there are two or more mobile communication terminals being determined as a target of communication among the mobile communication terminals within the communication coverage area of the mobile communication terminal 100 and thus the mobile communication terminal 100 receives two or is more identification response packets, the mobile communication terminal 100 determines a mobile communication terminal with the highest probability as the target of communication. For example, a mobile communication terminal closest to the straight line may be determined as a target mobile communication terminal.

In addition, if a result of analyzing the identification response packets received by the identification unit 150 shows that there is no communication terminal satisfying the communication target requirements, the identification unit 150 may determine that it has failed to recognize the target of communication, or may choose a mobile communication terminal with the highest probability from among the mobile communication terminals that have not satisfied the requirements but sent the response.

Moreover, the mobile communication terminal 100 may receive the identification response packet and determine whether to transmit and receive further packets to and from the mobile communication terminal which has sent the identification response packet. For example, when intending to transmit and receive data to and from the target mobile communication terminal 200, the mobile communication terminal 100 may take procedures for data communication with the target mobile communication terminal 200, or if the mobile communication terminal 100 is to simply estimate a distance to the target mobile communication terminal 200, it may not transmit further packets. The mobile communication terminal 100 may ignore identification response packets from the mobile communication terminals 300 and 400 other than the target mobile communication terminal 200.

FIGS. 5 to 9 are diagrams for explaining how to calculate the threshold $d_{th}$ in Formula 5. To this end, a case where errors are present only in location parameters and no errors are present in orientation parameters will be described first, and then by using the result of this case, a case where errors are present in both the location parameters and the orientation parameters.

Figure 5:
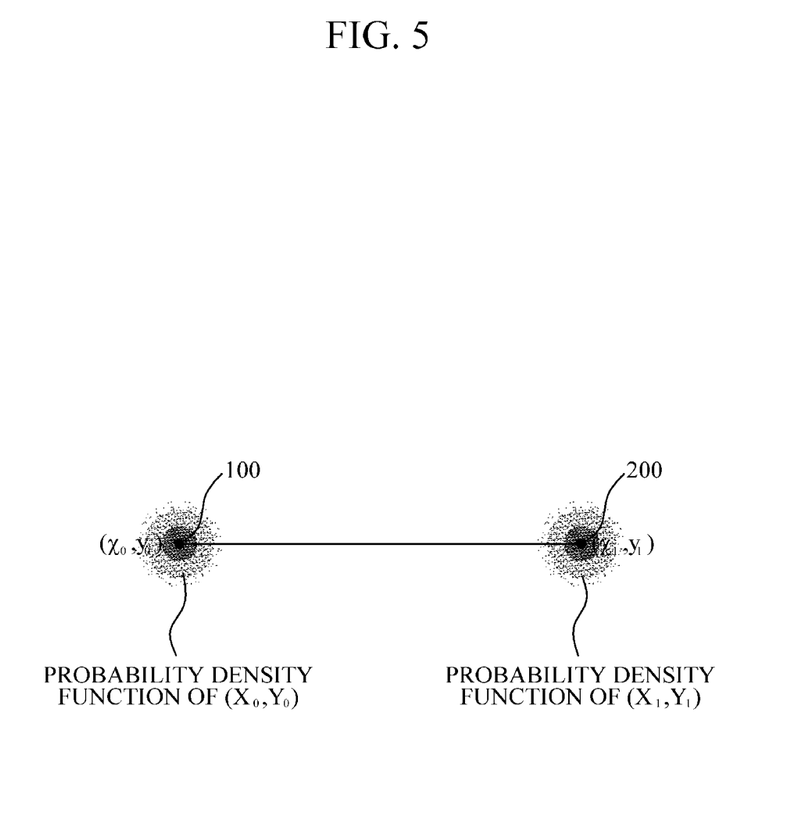
FIG. 5 is a diagram illustrating a probability distribution diagram in the case of the presence of location parameter errors in both the mobile communication terminal and the target mobile communication terminal.

FIG. 5 is a diagram illustrating a probability distribution diagram in the case of the presence of location parameter errors in both the mobile communication terminal and the target mobile communication terminal.

As shown in FIG. 5, in the case where there are errors in coordinates measured by a GPS or a similar system, elements in $(X_0, Y_0)$ denote random variables representing coordinates of the mobile communication terminal 100, which include location measurement errors and can be mathematically modeled as random variables.

A circle around $(x_0, y_0)$ depicted by a gray scale represents a probability density function of random variables $(X_0, Y_0)$, where a darker gray represents a higher probability density and a brighter gray represents a lower probability density. The probability distributions of $X_0$ and $Y_0$ may be determined by the environment and performance of a GPS in use. For explanation, it is assumed Formulas 7 to 10 given as shown below are satisfied, but even if the probability distributions of $X_0$ and $Y_0$ do not conform with the given Formulas 7 to 10, the principle of the exemplary embodiment of the present invention can still be applicable.

$$X_0 \sim N(x_0, \sigma_{x_0}^2) \tag{7}$$

$$Y_0 \sim N(y_0, \sigma_{y_0}^2) \tag{8}$$

$$\sigma = \sigma_{x_0} = \sigma_{y_0} \tag{9}$$

$$X_0 \perp\!\!\!\perp Y_0 \tag{10},$$

where a notation $N(m, \sigma^2)$ represents Gaussian distribution wherein m is an average and $\sigma^2$ is a variance and $\perp\!\!\!\perp$ represents that two random variables are independent of each other, $$E\{X_0\} = x_0 \tag{11}$$

$$\operatorname{var}\{X_0\} = y_0 \tag{12}$$

$$\operatorname{var}\{X_0\} = \sigma_{x_0}^2 \tag{13}$$

$$\operatorname{var}\{Y_0\} = \sigma_{x_0}^2 \tag{14}$$

Each element in $(X_1, Y_1)$ represents random variables that represent coordinates of the target mobile communication terminal 200. The example described herein assumes that $X_1$ and $Y_1$ have probability distributions as represented by formulas 15 to 18.

$$X_1 \sim N(x_1, \sigma_{x_1}^2) \tag{15}$$

$$Y_1 \sim N(y_1, \sigma_{y_1}^2) \tag{16}$$

$$\sigma = \sigma_{x_1} = \sigma_{y_1} \tag{17}$$

$$X_1 \perp\!\!\!\perp Y_1 \tag{18}$$

Additionally, it is assumed Formulas 19 and 20 given as below are satisfied:

$$(X_0, Y_0) \perp\!\!\!\perp (X_1, Y_1) \tag{19}$$

$$\sigma_1 = \sigma_1 \tag{20}$$

The above formulas indicate that the coordinate error of the mobile communication terminal 100 and the coordinate error of the target mobile communication terminal 200 are independent of each other (Formula 19), and that a sensor performance of a GPS or a similar system of the mobile communication terminal 100 is the same as a performance of a GPS sensor of the target mobile communication terminal (Formula 20). Using location coordinates $(X_0, Y_0)$ of the mobile communication terminal 100 and an angle θ of a straight line connecting the mobile communication terminal 100 and the target mobile communication terminal 200 with respect to the reference direction, an equation of the straight line may be obtained as Formula 21 below.

$$ax + by + C_0 = 0 \tag{21}$$

where a, b, and $C_0$ may be represented, respectively, as:

$$a = \sin(\theta) \tag{22}$$

$$b = \cos(\theta) \tag{23}$$

$$C_0 = -bY_0 - aX_0 \tag{24}$$

In this example assuming that there is no error in the orientation sensor and the coordinates $(X_0, Y_0)$ of the mobile communication terminal 100 are probability variables containing errors, a and b may be constants and $C_0$ may be a random variable. Since $X_0$ and $Y_0$ are random variables having Gaussian distributions, $C_0$ in Formula 24 is a random variable as $C_0$ in Formula 25.

$$C_0 \sim N(-by_0-ax_0, b^2\sigma_{y_0}^2+a^2\sigma_{x_0}^2)=N(-by_0-ax_0, \sigma_0^2) \quad (25)$$

The target mobile communication terminal 200 that has received (a, b, $C_0$) from the mobile communication terminal 100 may obtain its distance to the straight line as shown in Formula 26 using Formula 6.

$$|aX_1+bY_1+C_0| \quad (26)$$

When "$aX_1+bY_1$" is substituted by $C_1$ in Formula 26, $C_1$ may be represented as a random variable having Gaussian distribution as represented by Formula 27.

$$C1 \sim N((ax_1-by_1, a^2\sigma_{x_1}^2+b^2\sigma_{y_1}^2)=N(ax_1-by_1, \sigma_1^2) \quad (27)$$

By substituting $C_1$ for $aX_1+bY_1$ in Formula 26, Formula 28 may be obtained as blow.

$$|C_0+C_1| \quad (28)$$

When it is defined that $C=C_0+C_1$, because $E\{C_0+C_1\}=0$ and $(X_0, Y_0)$ and $(X_1, Y_1)$ are independent of each other, $C_0$ and $C_1$ are also independent of each other. Thus, the random variable C has a Gaussian distribution with a mean of 0 and a variance of $\sigma_0^2+\sigma_1^2=2\sigma_1^2$.

That is, $C=C_0+C_1 \sim N(0, 2\sigma_1^2)$ (Formula 29).

Thus, in the case of the orientation sensor having no errors, a probability that a distance between the straight line (a, b, $C_0$) and the target mobile communication terminal 200 is smaller than a threshold $d_{th}$ may be represented as:

$$Pr\{\text{distance}\{(X_1, Y_1), ax+by+C_0=0\} < d_{th}\} = \quad (30)$$
$$\frac{1}{\sqrt{2\pi(2\sigma_0^2)}}\int_{-d_{th}}^{d_{th}} \exp\left(-\frac{t^2}{2(2\sigma_0^2)}\right)dt$$

In Formula 30, it is assumed that $\sigma_0=\sigma_1$ (Formula 20), and in the case where $\sigma_0=\sigma_1$ is not satisfied, a variance value of C becomes $\sigma_0^2+\sigma_1^2$, instead of $2\sigma_0^2(=2\sigma_1^2)$, and thus if Formula 30 substitutes $\sigma_0^2+\sigma_1^2$ for $2\sigma_1^2$, it is possible to use Formula 30 intact.

Figure 6:
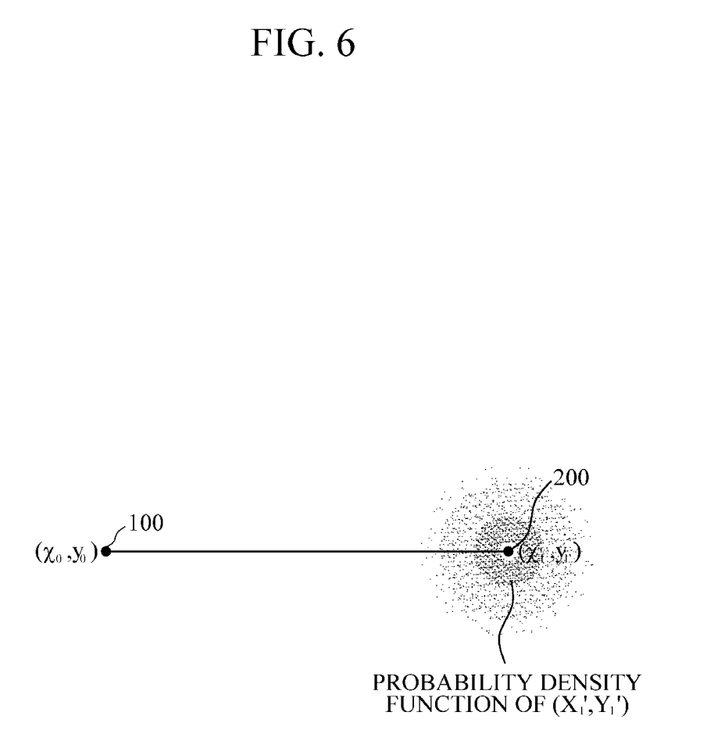
FIG. 6 is a diagram illustrating a probability distribution diagram, an equivalent model of the diagram shown in FIG. 5, in the case where a mobile communication terminal does not have a location parameter error but a target mobile communication terminal has a location parameter error.

FIG. 6 is a diagram illustrating a probability distribution diagram in the case where a mobile communication terminal does not have a location parameter error but a target mobile communication terminal has a location parameter error. The probability distribution diagram shown in FIG. 6 is a distribution model that is mathematically equivalent to the distribution model shown in FIG. 5.

It is assumed that a variance value of measurement errors of the mobile communication terminal 200 shown in FIG. 6 is the same as the sum of the variance value of the measurement errors of the mobile communication terminal 100 shown in FIG. 5 and the variance value of the measurement errors of the target mobile communication terminal 200 shown in FIG. 5. Hence, it may be appreciated that in the case of the presence of the location parameter errors, the two models shown in FIGS. 5 and 6 are mathematically equivalent to each other in terms of calculating a distance from the target mobile communication terminal 200 to the straight line of an identification formula. Hereinafter, for convenience of explanation, the equivalent mode shown in FIG. 6 will be used for description.

As shown in FIG. 6, where there are no errors in coordinates of the mobile communication terminal 100, coordinates of the target mobile communication terminal 200 are given as random variables $(X_1', Y_1')$ and probability functions of $X_1'$ and $Y_1'$ are given as Gaussian distributions represented as Formulas 31 to 34 as below:

$$X_1' \sim N(x_1, 2\sigma_{x_1}^2) \quad (31)$$

$$Y_1' \sim N(y_1, 2\sigma_{y_1}^2) \quad (32)$$

$$\sigma = \sigma_{x_1} = \sigma_{y_1} \quad (33)$$

$$X_1' \perp\!\!\!\perp Y_1' \quad (34)$$

In this case, a distance between the straight line (a, b, $c_0$) and the coordinates $(X_1', Y_1')$ of the target mobile communication terminal 200 may be calculated as Formula 35 below.

$$\text{distance}\{(X_1', Y_1'), ax+by+c_0=0\}=|c_0+C_1'| \quad (35),$$

where $$a=\sin(\theta) \quad (36)$$

$$b=\cos(\theta) \quad (37)$$

$$c_0=-by_0-ax_0 \quad (38)$$

$$C_1' \sim N((ax_1+by_1, 2\sigma_1^2) \quad (39)$$

$$c_0+C_1' \sim N(0, 2\sigma_1^2) \quad (40)$$

Hence, in a case where there is no error in the orientation sensor, a probability that the distance between the straight line (a, b, $c_0$) and the coordinates $(X_1', Y_1')$ of the target mobile communication terminal 200 is smaller than a threshold $d_{th}$ has the same value as Formula 30, as represented by Formula 41.

$$Pr\{\text{distance}\{(X_1', Y_1'), ax+by+c_0=0\} < d_{th}\} = \quad (41)$$
$$\frac{1}{\sqrt{2\pi(2\sigma_1^2)}}\int_{-d_{th}}^{d_{th}} \exp\left(-\frac{t^2}{2(2\sigma_1^2)}\right)dt$$

Figure 7:
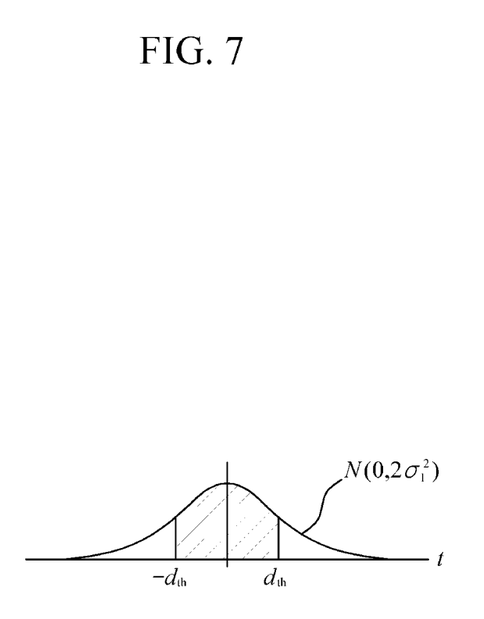
FIG. 7 is a graph showing a probability that a distance between a target mobile communication terminal and a straight line represented as an identification formula is smaller than a threshold when there are no errors in orientation parameters but errors exists in location parameters.

FIG. 7 is a graph showing a probability that a distance between a target mobile communication terminal and a straight line represented as an identification formula is smaller than a threshold when there are no errors in orientation parameters but errors exists in location parameters. That is, the graph shown in FIG. 7 plots Formula 41.

Referring to FIG. 7, the area of a shaded section indicates a probability that the distance between the target mobile communication terminal 200 and the straight line (ax+by+$c_0$=0) is smaller than the threshold $d_{th}$ when there are no errors in the orientation parameters.

Figure 8:
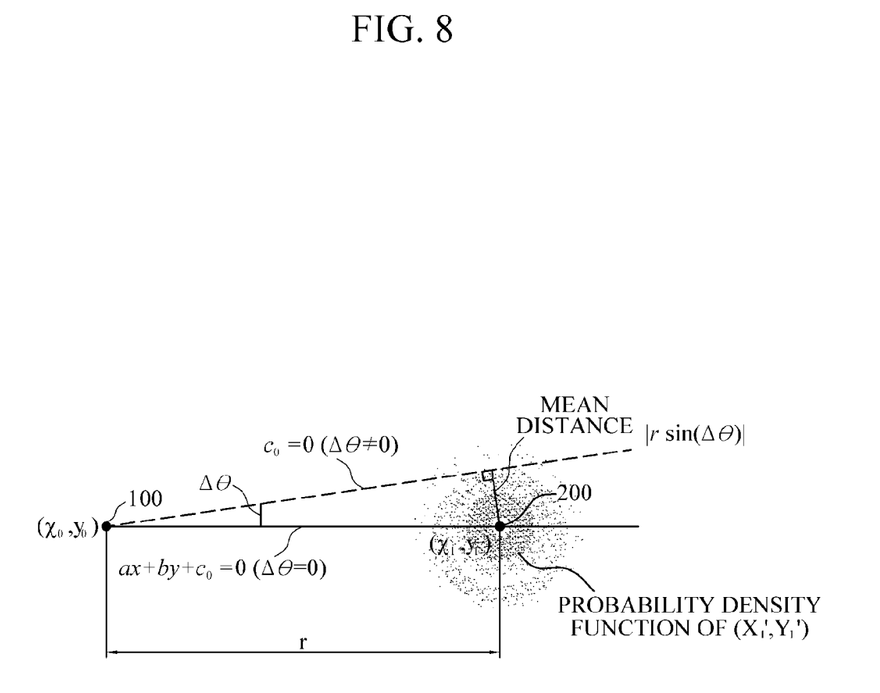
FIG. 8 is a diagram illustrating a probability distribution of locations of a target mobile communication terminal and a straight line represented as an identification formula when errors exist in both orientation parameters and location parameters.

FIG. 8 is a diagram illustrating a probability distribution of locations of a target mobile communication terminal and a straight line represented as an identification formula when errors exist in both orientation parameters and location parameters.

Referring to FIG. 8, there is an error of $\Delta\theta$ in an orientation angle of a mobile communication terminal 100, and when $\Delta\theta=0$, the equation of the straight line obtained by the mobile communication terminal 100 passes through mean coordinates $(x_1, y_1)$ of coordinates of the target mobile communication terminal 200. However, when $\Delta\theta \neq 0$, the straight line may not pass through the coordinates $(x_1, y_1)$. When $\Delta\theta \neq 0$, the distance from the target mobile communication terminal 200 to the straight line obtained by the target mobile communication terminal 200 may be expressed as Formula 42. In this case, it is assumed that the coordinates of the target mobile communication are given as random variables $(X_1', Y_1')$.

$$|aX_1' + bY_1' + c_0|(\Delta\theta \neq 0) \quad (42)$$

where the random variable $C' = aX_1' + bY_1' + c_0$ has a Gaussian distribution with a mean of $ax_1 + by_1 + c_0$ and a variance of $2\sigma_1^2$. That is, $$C' = aX_1' + bY_1' + c_0 \sim N((ax_1 + by_1 + c_0, 2\sigma^2)) \quad (43)$$

The mean of the random variable C' may be the same as a distance between the straight line $ax+by+c_0=0$ and the coordinates $(x_1, y_1)$. However, when $(x_1, y_1)$ is a mean of $(X_1', Y_1')$ and $\Delta\theta \neq 0$, the distance between the straight line $ax+by+c_0=0$ and the coordinates $(x_1, y_1)$ is $r\sin(\Delta\theta)$, and thus Formula 43 may be represented as Formula 44.

$$C' = aX_1' + bY_1' + c_0 \sim N(r\sin(\Delta\theta), 2\sigma_1^2) \quad (44)$$

Therefore, when random errors exist in GPS coordinates and an orientation sensor has an error of $\Delta\theta$, a probability that the distance between the straight line $ax+by+c_0=0$ and the coordinates of the target mobile communication terminal 200 is smaller than the threshold $d_{th}$ may be expressed as Formula 45 and Formula 46.

$$Pr\{\text{distance}\{(X_1', Y_1'), ax+by+c_0=0\} < d_{th}\} = Pr\{|C'| < d_{th}\} \quad (45)$$

$$= \frac{1}{\sqrt{2\pi(2\sigma_1^2)}} \int_{-d_{th}}^{d_{th}} \exp\left(-\frac{(t - r\sin(\Delta\theta))^2}{2(2\sigma_1^2)}\right) dt \quad (46)$$

Figure 9:
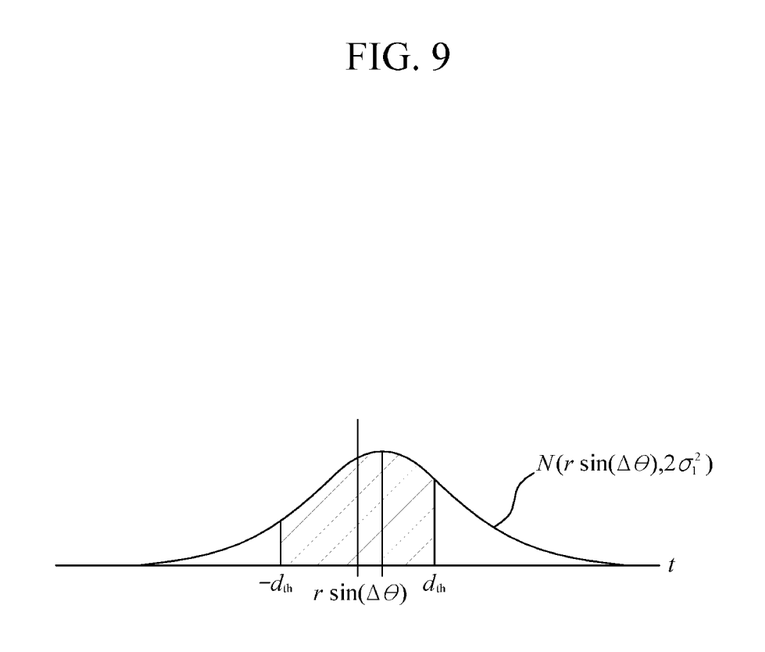
FIG. 9 is a graph showing a probability that a distance between a target mobile communication terminal and a straight line represented as an identification formula is smaller than a threshold when errors exists in orientation parameters and a probability distribution of errors in location parameters is known.

FIG. 9 is a graph showing a probability that a distance between a target mobile communication terminal and a straight line represented as an identification formula is smaller than a threshold when errors exists in orientation parameters and a probability distribution of errors in location parameters is known. That is, the graph shown in FIG. 9 plots Formula 46.

Referring to FIG. 9, the area of a shaded section indicates a probability of $|C'| < d_{th}$. Generally, the orientation angle error may be a random variable with a probability distribution. Where the random variable representing the orientation angle error is given as $\Delta\theta$ and $\Delta\theta$ is a Gaussian random variable with zero mean and a variance of $\sigma_\theta^2$, a probability that the distance between the straight line $ax+by+c_0=0$ and the coordinates of the target mobile communication terminal 200 is smaller than the threshold $d_{th}$ may be expressed as Formula 47.

$$Pr\{\text{distance} < d_{th}\} = \int_{-\infty}^{\infty} p_{\Delta\theta}(\theta) \int_{-d_{th}}^{d_{th}} p_{T|\Delta\theta}(t|\theta) dt d\theta \quad (47),$$

where $p_{\Delta\theta}(\theta)$ is a probability density function of $\Delta\theta$. Where T is a random variable that represents a distance between the straight line and $(X1', Y1')$, $p_{T|\Delta\theta}(t|\theta)$ is a conditional probability density function of T when $\Delta\theta=\theta$ is given. $p_{\Delta\theta}(\theta)$ may be represented as Formula 48 and $p_{T|\Delta\theta}(t|\theta)$ may be represented as Formula 49.

$$p_{\Delta\theta}(\theta) = \frac{1}{\sqrt{2\pi\sigma_\theta^2}} \exp\left(-\frac{\theta^2}{2\sigma_\theta^2}\right) \quad (48)$$

$$p_{T|\Delta\theta}(t|\theta) = \frac{1}{\sqrt{2\pi(2\sigma_1^2)}} \exp\left(-\frac{(t - r\sin(\theta))^2}{2(2\sigma_1^2)}\right) \quad (49)$$

The statistical properties of the errors in an orientation sensor may be obtained from a manufacturer of the sensor. However, the orientation angle error $p_{\Delta\theta}(\theta)$ in Formula 48 may include errors by a user of the mobile communication terminal 100 as well as the errors in the orientation sensor. Thus, for more accurate calculation, $p_{\Delta\theta}(\theta)$ may be obtained from measurement data of the orientation angle along with information regarding the orientation sensor errors provided by the orientation sensor manufacturer.

$\sigma_1^2$ Formula 49 may be obtained from a manufacturer of a GPS sensor.

By using the statistical properties of the errors defined in Formulas 48 and 49, $d_{th}$ can be calculated from Formula 47. The greater value is set for $Pr\{\text{distance} < d_{th}\}$, the greater a value of $d_{th}$ is, and on the contrary, the smaller value is set for $Pr\{\text{distance} < d_{th}\}$, the smaller a value of $d_{th}$ is.

Meanwhile, $d_{th}$ may be affected not only by a value of $Pr\{\text{distance} < d_{th}\}$ but also by r, that is, a distance between the mobile communication terminal 100 and the target mobile communication terminal 200. As r increases, $d_{th}$ may also increase with respect to the same $Pr\{\text{distance} < d_{th}\}$, and as r reduces, $d_{th}$ may also be reduced. It may be more advantageous to use a different threshold $d_{th}$ depending on r than to use a single threshold $d_{th}$. When r is small, $d_{th}$ may change more sensitively to $\sigma_1^2$ than to $\sigma_\theta^2$ and on the contrary, when r is large, $d_{th}$ may change more sensitively to $\sigma_\theta^2$ than to $\sigma_1^2$.

The distance between the mobile communication terminal 100 and the target mobile communication terminal 200 may be not an actual constant but a random variable. Under the assumption that R is a random variable representing a distance between the mobile communication terminal and the target mobile communication terminal 200, R has a noncentral chi distribution with 2 degree of freedom which may be taken into account for more accurate calculation. In consideration of a probability density function of R, Formula 47 may be rearranged as Formula 50.

$$Pr\{\text{distance} < d_{th}\} = \int_{-\infty}^{\infty} \int_0^{\infty} p_{\Delta\theta}(\theta) p_R(r) \int_{-d_{th}}^{d_{th}} p_{T|\Delta\theta}(t|\theta, r) dt dr d\theta \quad (50),$$

where $p_R(r)$ is a probability density function of R and $p_{T|\Delta\theta}(t|\theta, r)$ is a conditional probability density function of T when $\Delta\theta = 0$ and R=r are given.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for a mobile communication terminal to recognize a target mobile communication terminal, the method comprising:
   acquiring own location information of the mobile communication terminal;
   creating identification verification information using the location information, the identification verification information containing an identification formula for identifying the target mobile communication terminal as a target of communication;
   transmitting the created identification verification information to at least one other mobile communication terminal within a communication coverage area;
   receiving an identification response packet from the at least one other mobile communication terminal which has received the identification verification information, the identification response packet indicating whether the other mobile communication terminal is a target mobile communication terminal; and determining the target mobile communication terminal based on the received identification response packet, wherein the at least one other mobile communication terminal executes the identification formula by using own location information of the at least one other mobile communication terminal to determine whether the at least one other mobile communication terminal is the target mobile communication terminal.

2. The method of claim 1, wherein the acquiring of the location information comprises receiving the own location information of the mobile communication terminal and calculating own location parameters using the received location information, and calculating orientation parameters with respect to the target mobile communication using an orientation sensor.

3. The method of claim 2, wherein the calculating of the own location parameters comprises calculating an orientation angle of the target mobile communication terminal with respect to a reference direction that is parallel to a latitude line.

4. The method of claim 1, wherein the creating of the identification verification information comprises creating the identification verification information including an identification formula that is an equation of a straight line connecting the mobile communication terminal and the target mobile communication terminal.

5. The method of claim 1, wherein the creating of the identification verification information comprises creating the identification verification information further including information about accuracy of the location parameters of the mobile communication terminal.

6. The method of claim 5, wherein the receiving of the identification response packet comprises receiving the identification response packet from the at least one other mobile communication terminal which has received the identification verification information within the communication coverage area wherein the identification response packet indicates a determination which is made, using a threshold obtained based on the information about accuracy of the location parameters of each of the at least one other mobile communication terminal, which has received the identification verification information, and the information about accuracy of the location parameters of the mobile communication terminal, on whether or not the at least one other mobile communication terminal is the target mobile communication terminal.

7. The method of claim 1, wherein the creating of the identification verification information comprises creating the identification verification information further including preferred distance range information of the mobile communication terminal.

8. The method of claim 7, wherein the receiving of the identification response packet comprises receiving the identification response packet from the at least one other mobile communication terminal, the identification response packet indicating a determination which is made, using the preferred distance range information, on whether the at least one other mobile communication terminal is the target mobile communication terminal.

9. The method of claim 1, wherein the determining of the target mobile communication terminal comprises, when receiving a plurality of identification response packets, analyzing the received identification response packets and determining a mobile communication terminal with a highest probability as the target mobile communication terminal based on a result of analysis.

10. The method of claim 1, further comprising:
determining whether to further transmit and receive a packet to and from the determined target mobile communication terminal.

11. An apparatus for a mobile communication terminal to recognize a target mobile communication terminal, wherein the apparatus is executed in the mobile communication terminal, comprising:
a location sensor unit configured to measure own location information of the mobile communication terminal;
an identification verification information creation unit configured to create identification verification information by forming an identification formula using the location information; and
an identification unit configured to transmit the identification verification information to at least one other mobile communication terminal within a communication coverage area and determine whether the at least one other mobile communication terminal that transmits an identification response packet to the identification unit in response to the identification verification information is the target mobile communication terminal based on the received identification response packet,
wherein the at least one other mobile communication terminal executes the identification formula by using own location information of the at least one other mobile communication terminal to determine whether the at least one other mobile communication terminal is the target mobile communication terminal.

12. The apparatus of claim 11, wherein the location sensor unit is configured to comprise
a coordinate sensor unit configured to receive the own location information of the mobile communication terminal and calculate own location parameters, and
an orientation sensor unit configured to calculate orientation parameters with respect to the target mobile communication terminal using an orientation sensor.

13. The apparatus of claim 11, wherein the identification verification information creation unit is configured to create the identification verification information by forming an identification formula that is an equation of a straight line connecting the mobile communication terminal and the target mobile communication terminal using the location information.

14. The apparatus of claim 11, wherein the identification verification information creation unit is configured to create the identification verification information further including information about accuracy of location parameters of the mobile communication terminal.

15. The apparatus of claim 11, wherein the identification unit is configured to, when receiving a plurality of identification response packets from a plurality of other mobile communication terminals within the communication coverage area, analyze the received identification response packets and determine a mobile communication terminal with a highest probability as the target mobile communication terminal based on a result of analysis.

* * * * *